United States Patent
Nishikawa

(10) Patent No.: US 10,117,147 B2
(45) Date of Patent: Oct. 30, 2018

(54) SERVER DEVICE, BASE STATION, INFORMATION PROCESSING METHOD, AND STORAGE MEDIUM

(71) Applicant: NEC Corporation, Minato-ku, Tokyo (JP)

(72) Inventor: Tomohiro Nishikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 8 days.

(21) Appl. No.: 15/315,430

(22) PCT Filed: Jan. 20, 2015

(86) PCT No.: PCT/JP2015/000222
§ 371 (c)(1),
(2) Date: Dec. 1, 2016

(87) PCT Pub. No.: WO2015/186277
PCT Pub. Date: Dec. 10, 2015

(65) Prior Publication Data
US 2017/0195925 A1 Jul. 6, 2017

(30) Foreign Application Priority Data
Jun. 6, 2014 (JP) .................. 2014-117430

(51) Int. Cl.
*H04W 36/08* (2009.01)
(52) U.S. Cl.
CPC .................... *H04W 36/08* (2013.01)
(58) Field of Classification Search
CPC ................................ H04W 36/08
See application file for complete search history.

(56) References Cited

U.S. PATENT DOCUMENTS 8,140,051 B2 3/2012 Yuuki
8,600,385 B2 12/2013 Yasuoka
(Continued)

FOREIGN PATENT DOCUMENTS

JP 2009-044336 A 2/2009
JP 2010-233144 A 10/2010
(Continued)

OTHER PUBLICATIONS

3rd Generation Partnership Project; Technical Specification Group Radio Access Network; Evolved Universal Terrestrial Radio Access Network (E-UTRAN); X2 application protocol (X2AP) (Release 12), 3GPP TS36.423, V12.1.0 (Mar. 2014).
(Continued)

*Primary Examiner* — Pao Sinkantarakorn
*Assistant Examiner* — Kabir Jahangir

(57) ABSTRACT

A server device can more appropriately manage inter-station links. The server device includes a storage unit connected to a wireless access network and configured to store a handover list, the handover list being a list in which a base station that is a handover destination of a mobile terminal wirelessly connected to a managed base station is registered, the managed base station being a base station managed by the server device. The server device includes a control unit configured to determine whether to keep or disconnect an established inter station link by determining whether another base station that establishes the established inter station link with the managed base station is registered in the handover list, the established inter station link being a communication link between the another base station and the managed base station.

3 Claims, 12 Drawing Sheets

(56) References Cited

U.S. PATENT DOCUMENTS

| | | | |
|---|---|---|---|
| 2008/0096562 A1* | 4/2008 | Wu | H04L 29/12301 |
| | | | 455/436 |
| 2009/0042597 A1 | 2/2009 | Yuuki | |
| 2009/0207855 A1* | 8/2009 | Watanabe | H04L 69/22 |
| | | | 370/466 |
| 2010/0020761 A1* | 1/2010 | Kunugi | H04W 36/0055 |
| | | | 370/331 |
| 2010/0067484 A1* | 3/2010 | Kagimoto | H04W 4/20 |
| | | | 370/331 |
| 2010/0248723 A1 | 9/2010 | Yasuoka | |
| 2012/0100860 A1 | 4/2012 | Lei et al. | |
| 2012/0202556 A1* | 8/2012 | Mori | H04W 36/30 |
| | | | 455/525 |

FOREIGN PATENT DOCUMENTS

| | | |
|---|---|---|
| JP | 2012-095291 A | 5/2012 |
| WO | 2013/141086 A1 | 9/2013 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), 3GPP TS36.300, V12.1.0 (Mar. 2014).

International Search Report for PCT Application No. PCT/JP2015/000222, dated Apr. 21, 2015.

English translation of Written opinion for PCT Application No. PCT/JP2015/000222.

\* cited by examiner

Fig.3

| Served Cell Info | | Neighbor cell info | | | |
|---|---|---|---|---|---|
| eNB ID | Cell ID | ECGI | PCI | EARFCN | TAC |
| A | 0 | 111... | 10 | 0 | 1 |
| ...... | ...... | ...... | ...... | ...... | ...... |
| B | 1 | 222... | 20 | 0 | 2 |
| ...... | ...... | ...... | ...... | ...... | ...... |
| C | 2 | 333... | 30 | 0 | 3 |
| ...... | ...... | ...... | ...... | ...... | ...... |

Fig. 8

| Served Cell Info | | | | Neighbor info | | | |
|---|---|---|---|---|---|---|---|
| plmn ID | Cell ID | PCI | TAC | ECGI | PCI | EARFCN | TAC |
| A | 0 | A | 0 | 111... | 10 | 0 | 1 |
| ..... | ..... | ..... | ..... | ..... | ..... | ..... | ..... |
| B | 1 | B | 1 | 222... | 20 | 0 | 2 |
| ..... | ..... | ..... | ..... | ..... | ..... | ..... | ..... |
| C | 2 | C | 2 | 333... | 30 | 0 | 3 |
| ..... | ..... | ..... | ..... | ..... | ..... | ..... | ..... |

SERVER DEVICE, BASE STATION, INFORMATION PROCESSING METHOD, AND STORAGE MEDIUM

This application is a National Stage Entry of PCT/JP2015/000222 filed on Jan. 20, 2015, which claims priority from Japanese Patent Application 2014-117430 filed on Jun. 6, 2014, the contents of all of which are incorporated herein by reference, in their entirety.

TECHNICAL FIELD

This disclosure relates to a base station in a mobile communication system, a server device, an information processing method, and storage medium.

BACKGROUND ART

An LTE (Long Term Evolution) system is in practical use as one of technologies used for a wireless access network of a mobile communications system. Handover in this LTE system will be described simply.

FIG. 10 is a figure for explaining a communication network including a related LTE system.

The wireless access network is connected to a core network. In the wireless access network, eNBs (evolutional Node Bs) 101 to 103 that are the base stations corresponding to the LTE system are installed. In the core network, MMEs (Mobile Management Entities) 21 and 22 that accommodate the eNB and are the devices of a core network system are installed.

In FIG. 10, an inter-station link that is a communication link between an eNB 102 and an eNB 103 is established. This inter-station link is called an "X2 interface" or an "X2 link" and hereinafter, referred to as the "X2 link".

In an example shown in FIG. 10, a core-inter station link that is a communication link between a MME 21 of a core network side and the eNB 101 is shown. This core-inter station link is called an "S1 interface" or an "S1 link" and hereinafter, referred to as the "S1 link". In FIG. 10, the S1 link is established between the MME 21 and the eNB 102, between the eNB 102 and the MME 22, and between the eNB 103 and the MME 22. Further, FIG. 10 shows a state in which a UE (User Equipment, a portable terminal) 31 moves from a communication cell of the eNB 102 to a communication cell of the eNB 101 and a UE 32 moves from a communication cell of the eNB 102 to a communication cell of the eNB 103.

FIG. 11 is a sequence diagram showing a handover procedure in which a handover is performed between the eNBs shown in FIG. 10. Here, as shown in FIG. 10, a case in which the X2 link is established between the eNBs (between the eNB 102 and the eNB 103) will be explained.

In the handover performed between the eNBs, the eNB 102 transmits a handover request (HANDOVER REQUEST) to the eNB 103 and receives a handover request confirmation (HANDOVER REQUEST ACKNOWL-EDGE) from the eNB 103 (refer to non-patent literature 1).

In a case in which the X2 link is established between the eNBs, as described above, when the UE performs the handover, information is transmitted and received between the eNBs by using the X2 link and whereby, the handover can be performed. When the X2 link is not established between one eNB and another eNB that is a handover destination, two eNBs have to transmit/receive the information via the S1 link. In this case, the time required to perform handover increases and the burden on the MME of the core network side increases.

A SON (Self-Organizing Network) function is studied in 3GPP (3rd Generation Partnership Project) and an ANR (Automatic Neighbor Relation) function is included in the SON function (refer to non-patent literature 2). The SON function is a function to automatically and optimally set a parameter of the base station. The purpose of the ANR function is to reduce the burden on an operator which occurs at the time of managing the relationship between the eNBs that are adjacent to each other. The ANR function manages another eNB that exists in the neighborhood, in other words, the adjacent (Neighbor) eNB, by using a NRT (Neighbor Relation Table) and adds the adjacent eNB in the NRT when the adjacent eNB is detected. When the eNB detects a new adjacent eNB by this ANR function, it is expected to establish the X2 link between the eNB and the adjacent eNB.

However, in an actual network, the number of the X2 links which can be established by one eNB is limited because there is a limitation on installation. Therefore, it is impossible for the eNB to establish the X2 link with all the eNBs detected by the ANR function without limitation. For this reason, when the number of the established X2 links is equal to the maximum installable number of the X2 links, the X2 link cannot be newly established. As a result, handover is frequently performed via the S1 link and the burden on the core network increases. Further, when an EMS (Element Management System) for managing the eNB is installed, if the useless X2 link remains established, the burden on the EMS increases.

An example of a method for removing the useless X2 link is disclosed in patent literature 1. In the invention disclosed in patent literature 1, a source eNB acquires the number of occurrences of handover to a target eNB and compares it with a predetermined threshold value. When a comparison result shows that the number of handover occurrences is less than the predetermined threshold value, the source eNB determines that the number of occurrences of handover to the target eNB decreases and releases the X2 interface between the source eNB and the target eNB.

Further, in patent literature 2, it is disclosed an invention in which when handover is performed between the eNBs that are adjacent to each other, a user (U-Plane) signal and a control (C-Plane) signal are directly forwarded via the X2 interface. Further, a second base station receives a broadcast packet from a first base station, determines an adjacent condition between wireless service areas based on location information and radius information of a wireless service area included in a received packet and location information and radius information of the wireless service area of the first base station and establishes the link between the first and second base stations that satisfy this adjacent condition.

CITATION LIST

Patent Literature

Patent literature 1: Unexamined Patent Application Publication No. 2010-233144
Patent literature 2: Unexamined Patent Application Publication No. 2009-044336

Non-Patent Literature

Non-patent literature 1: 3GPP TS36.423 (8.2.1 Handover Preparation) Version 12.1.0

Non-patent literature 2: 3GPP TS36.300 (22.3.2a Automatic Neighbour Relation Function) Version 12.1.0

SUMMARY OF INVENTION

Technical Problem

In the method disclosed in patent literature 1, by comparing the number of handover occurrences with the threshold value, it is determined whether to release or not the X2 link. In the method disclosed in patent literature 1, the number of occurrences of handover to each target eNB is counted and the counted value is recorded in a handover occurrence number table. The process in which the number of occurrences of handover to each target eNB is counted and recorded is complicated. Therefore, the process burden increases. Accordingly, for example, in a state in which a large number of base stations exist and the cells intricately overlap each other, the burden on the entire system increases. In this case, a problem in which the burden on a device for managing such system such as the EMS increases occurs.

An object of an exemplary example embodiment of the present invention is to solve the problem on the technology mentioned above and provide a server device which can more appropriately manage an inter-station link, a base station, an information processing method, and a storage medium. Further, it should be noted that this purpose is one of a plurality of purposes of the present invention that are achieved by the example embodiment disclosed in this description. Another purpose or problem and a new feature will become apparent from the description of this specification or the accompanying drawing.

Solution to Problem

A server device according to the exemplary example embodiment has a configuration in which the server device includes:

a storage unit which is connected to a wireless access network and stores a handover list that is a list in which another base station that is a handover destination of a portable terminal wirelessly connected to a managed base station is registered with respect to the managed base station that is the base station managed by the server device and a control unit which determines whether to disconnect or not the established inter-station link by determining whether or not the another base station with which the inter-station link, that is a communication link between the another base station and the managed base station, is established is registered in the handover list.

Further, a base station according to the exemplary example embodiment has a configuration in which the base station includes:

a storage unit which stores a handover list that is a list in which another base station that is a handover destination of a portable terminal wirelessly connected to the base station is registered and a control unit which determines whether to disconnect or not the established inter-station link by determining whether or not the another base station with which the inter-station link, that is a communication link between the another base station and the base station, is established is registered in the handover list.

An information processing method according to the exemplary example embodiment is an information processing method performed by a server device for managing a base station connected to a wireless access network. The information processing method comprises:

storing a handover list that is a list in which another base station that is a handover destination of a portable terminal wirelessly connected to a managed base station that is a base station managed by the server device is registered and determining whether to disconnect or not the established inter-station link by determining whether or not another base station with which the inter-station link, that is a communication link between the another base station and the managed base station, is established is registered in the handover list.

Further, a storage medium according to the exemplary example embodiment is a storage medium for storing a program which causes a computer for managing a base station connected to a wireless access network to perform:

a procedure for storing a handover list that is a list in which another base station that is a handover destination of a portable terminal wirelessly connected to a managed base station that is a base station managed by the computer is registered and a procedure for determining whether to disconnect or not the established inter-station link by determining whether or not another base station with which the inter-station link, that is a communication link between the another base station and the managed base station, is established is registered in the handover list.

Advantageous Effects of Invention

By using the exemplary example embodiment of the present invention, an inter-station link can be more appropriately managed.

BRIEF DESCRIPTION OF DRAWINGS

FIG. 3 is a figure showing an example of a structure of a HO (Handover) list stored in an EMS server shown in FIG. 1.

FIG. 8 is a figure showing an example of adjacent cell information stored in an EMS server according to a fourth exemplary example embodiment.

DESCRIPTION OF EMBODIMENTS

Figure 1:
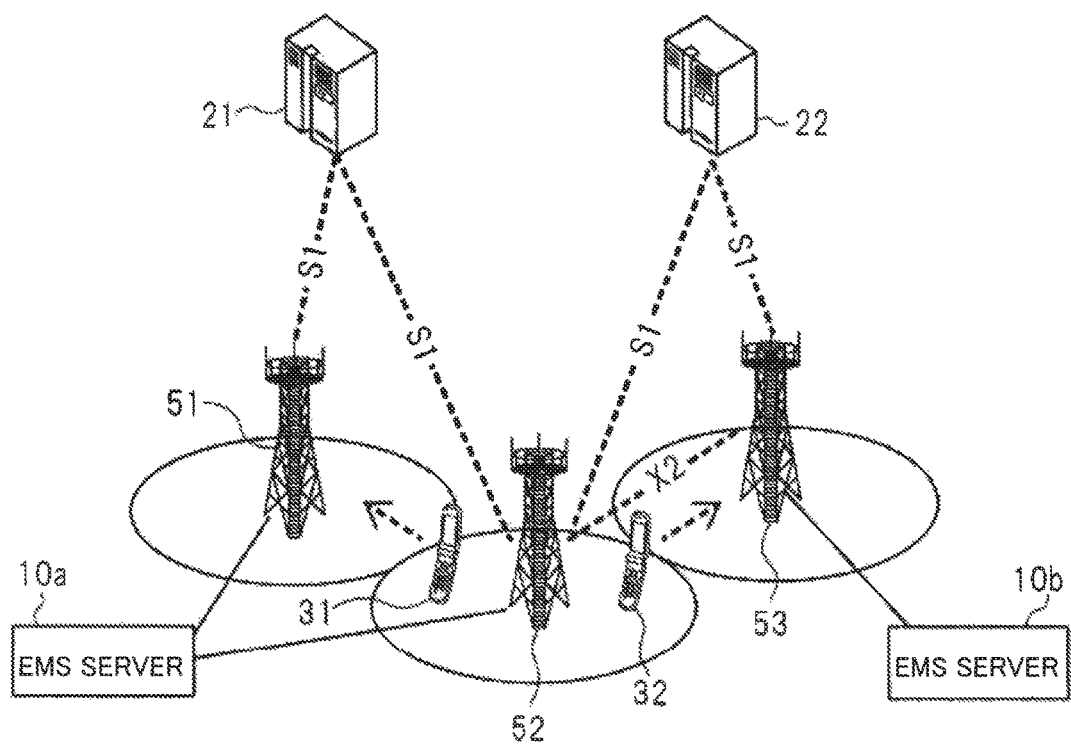
FIG. 1 is a figure showing an example of a configuration of a communication network including an LTE system according to a first exemplary example embodiment.

A specific example embodiment will be described in detail below with reference to the drawing. The same reference numbers are used for the elements having the same functions in the drawing and for clarifying the explanation, the explanation of the element will be omitted appropriately.

A plurality of example embodiments described below can be independently performed or appropriately combined and performed. Each of a plurality of the example embodiments has new feature that is different from each other. Accordingly, a plurality of example embodiments contribute to realizing the objects or solving the problems that are different from each other and have effects that are different from each other.

First Example Embodiment

A configuration of an LTE system according to a first exemplary example embodiment will be described. FIG. 1 is a figure showing an example of a configuration of a communication network including the LTE system according to this example embodiment.

As shown in FIG. 1, the LTE system includes eNBs 51 to 53 and device management servers (hereinafter, referred to as EMS servers) 10a and 10b which manage the eNBs 51 to 53. In an example shown in FIG. 1, the EMS server 10a manages the eNB 51 and the eNB 52 and the EMS server 10b manages the eNB 53. Hereinafter, the eNB managed by the EMS server is referred to as a "managed eNB" and the eNB that is not managed by the EMS server is referred to as a "non-managed eNB". In FIG. 1, for example, the eNBs 51 and 52 are the managed eNBs of the EMS server 10a but the eNB 53 is the non-managed eNB of the EMS server 10a.

The MMEs 21 and 22 are provided in the core network side. In an example shown in FIG. 1, the S1 link is established between the eNB 51 and the MME21 and between the eNB 52 and the MME21 and also the S1 link is established between the eNB 52 and the MME22 and between the eNB 53 and the MME22. Further, the X2 link is established between the eNB 52 and the eNB 53.

The configuration of the EMS server according to this example embodiment will be described.

Further, in this example embodiment, the detailed description about a common function (for example, a function to collect a communication condition report from the managed eNB and grasp the state of the network, a function to perform network optimization including base station control, or the like) provided in the EMS server will be omitted.

Figure 2:
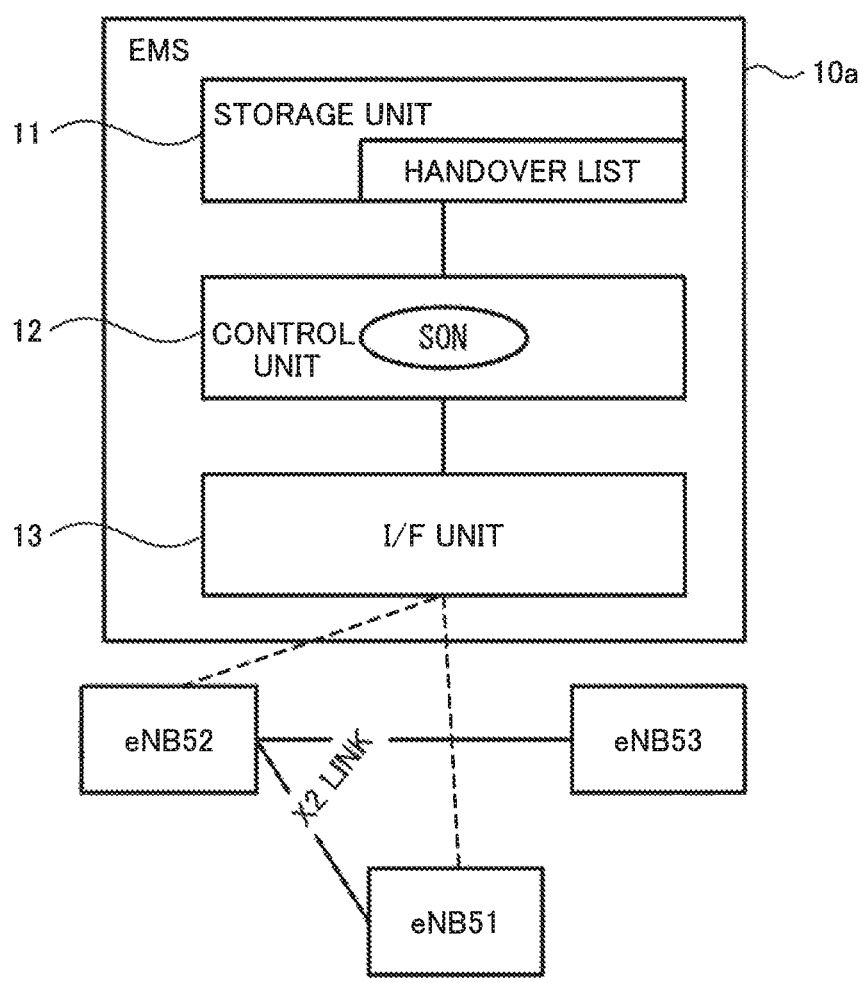
FIG. 2 is a block diagram showing an example of a configuration of an EMS server shown in FIG. 1.

FIG. 2 is a block diagram showing an example of the configuration of the EMS server shown in FIG. 1. In FIG. 1, the configuration of the EMS server 10a is similar to that of the EMS server 10b. Therefore, the configuration of the EMS server 10a will be described here. Further, it is assumed that the X2 link is established between the eNB 52 and the eNB 51 and between the eNB 52 and the eNB 53.

The EMS server 10a includes a storage unit 11, a control unit 12, and an I/F unit 13. The storage unit 11 comprises a database and the database stores a handover list (hereinafter, referred to as a HO list) in which a handover destination to which a UE performs handover from the cell of the eNB is registered. Further, the control unit 12 additionally has a SON function to perform management (update, addition, deletion, or the like) of the HO list in addition to the common function. By this SON function, the control unit 12 can obtain information indicating whether or not the X2 link between the managed eNBs and the X2 link between the managed eNB and the non-managed eNB are used when the UE performs handover. Each element shown in FIG. 2 will be described in detail below.

The storage unit 11 is composed of a memory such as a HDD (Hard Disk Drive), a semiconductor storage module, or the like. The storage unit 11 stores various information used for the control of the managed eNB. For example, the HO list and eNB information required for the control of the managed eNB by the EMS server are stored in the storage unit 11. The eNB information is information of the managed eNB for example, information about wireless communication quality of the cell, a parameter setting value for realizing the best wireless communication quality, or the like.

Here, the structure of the HO list stored (held) by the storage unit 11 will be described. FIG. 3 is a figure showing an example of the structure of the HO list stored in the EMS server according to this example embodiment.

The HO list shown in FIG. 3 is created based on a MR (Measurement Report) collected from the UE. This HO list is stored in the storage unit 11 as a master of information indicating the handover destination. When the HO list is updated, the control unit 12 notifies each managed eNB of this information and the HO list stored in each managed eNB is updated.

As shown in FIG. 3, the HO list has two columns: a served cell information (Served Cell Info) column and an adjacent cell information (Neighbor cell info) column.

Information about the cell of the managed eNB which provides a service to the UE (which is connected to the UE and communicates with the UE) is stored in the served cell information column. Information about the cell of the adjacent eNB that is the handover destination of the UE is stored in the adjacent cell information column. Thus, in the HO list stored in the storage unit 11, the adjacent cell information of the eNB that is the handover destination of the UE and the managed eNB stored in the served cell information column are associated with each other and stored. Namely, when the control unit 12 specifies the managed eNB in the served cell information column and reads the adjacent cell information associated with the managed eNB that is specified, the control unit 12 can view the HO list that is the same as the HO list stored in the managed eNB.

In the HO list, the served cell information column has an eNB ID sub column in which an identifier for identifying each eNB is stored and a cell ID sub column in which an identifier for identifying for each cell is stored. In an example shown in FIG. 3, in the eNB ID sub column of the served cell information column, the identifiers of "A", "B", and "C" are stored as the ID of the eNB managed by the EMS server 10a.

The adjacent cell information column has an ECGI (E-UTRAN Cell Global Identifier) sub column, a PCI (Physical Cell Identifier) sub column, an EARFCN (E-UTRA Absolute Radio Frequency Channel Number) sub column, and a TAC (Tracking Area Code) sub column. The ECGI is an ID used for identifying the cell in global. The PCI is an ID for cell identification in the LTE system. EARFCN is an item for defining a carrier frequency used in the cell for uplink direction or the cell for downlink direction in a FDD (Frequency Division Duplex) system or a carrier frequency used in the cell for both uplink and downlink directions in a TDD (Time Division Duplex) system. In the TAC sub column, the code of a cell unit which is composed of one or more cells and shows the position of a portable terminal managed in the network is stored.

The I/F unit 13 communicates with each of the eNB 51 and the eNB 52 that are the managed eNBs. The I/F unit 13 transmits the information received from the managed eNB to the control unit 12 and transmits the information received from the control unit 12 to the managed eNB according to the instruction of the control unit 12.

The control unit 12 includes a memory (not shown) for storing a program and a CPU (Central Processing Unit) (not shown) for executing a process according to the program. When the CPU executes the process according to the program, in the control unit 12, the various functions including the SON function that are provided in the EMS server are performed. In this example embodiment, the following function is added to the SON function performed by the control unit 12.

The control unit 12 periodically collects the MR transmitted from the UE to the eNB from the eNB managed by the server device and updates the HO list shown in FIG. 3 according to the content of the collected MR. Further, the control unit 12 inquires of each of the managed eNBs about another eNB with which the X2 link, that is a communication link between each managed eNB and the another eNB, is established and collects information about the another eNB with which the X2 link is established for each managed eNB.

The control unit 12 refers to (or reads out) the HO list shown in FIG. 3 and determines whether or not the X2 link established by the managed eNB is a useless X2 link. Further, the control unit 12 determines whether to disconnect or not the X2 link according to the determination result.

This will be specifically described. The control unit 12 determines whether to disconnect or not the X2 link by checking whether or not another eNB with which the X2 link is established by the managed eNB that is an object is registered in the HO list as the handover destination. When the check result shows that the another eNB is registered in the HO list as the handover destination, the control unit 12 does not instruct the managed eNB that is the object in order to keep the X2 link connected. On the other hand, when the check result shows that the another eNB is not registered in the HO list as the handover destination, the control unit 12 makes the managed eNB disconnect the X2 link.

Further, an arithmetic processing device installed in the control unit 12 is not limited to the CPU and may be a DSP (Digital Signal Processor).

Figure 4:
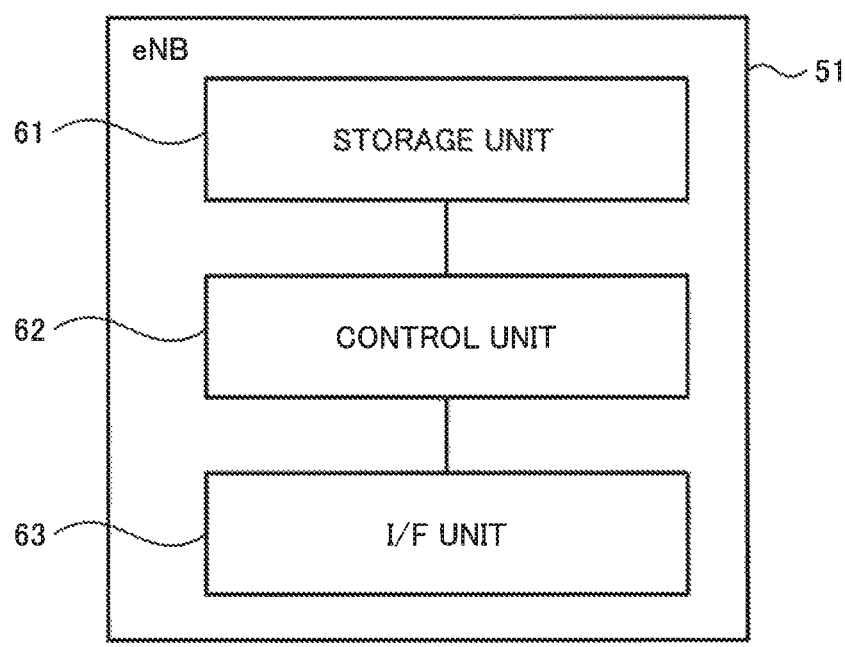
FIG. 4 is a block diagram showing an example of a configuration of a base station shown in FIG. 1.

Next, the configuration of the eNBs 51 to 53 shown in FIG. 1 will be described. FIG. 4 is a block diagram showing an example of a configuration of the base station in the LTE system according to this example embodiment.

However, the configurations of the eNBs 51 to 53 are similar to each other. Therefore, the configuration of the eNB 51 will be described here and the description of other eNBs will be omitted.

Further, the detailed description of the function commonly provided in the eNB will be omitted and a part related to the present invention will be described in detail.

As shown in FIG. 4, the eNB 51 includes a storage unit 61, a control unit 62 which establishes the X2 link between the eNB 51 and another eNB, and an I/F unit 63 which connects the eNB 51 to another device to communicate with the another device.

The storage unit 61 stores the HO list and X2 information. The HO list is a list in which the another base station that is the handover destination of the UE wirelessly connected to the eNB 51 is listed. The X2 information is information used for managing the X2 link. The X2 information includes an IP (Internet Protocol) address of the adjacent eNB that is a link destination with which the X2 link is established by the eNB 51 and an eNB ID that is a base station identifier corresponding to the adjacent eNB.

Further, information indicating whether or not the X2 link is established between the eNB 51 and the adjacent eNB is included in X2 information and this information is updated by the control unit 62 according to the establishment or disconnection of the X2 link.

The control unit 62 includes a memory (not shown) for storing a program and a CPU (not shown) which executes a process according to the program. When the control unit 62 receives the MR including information of a candidate for the handover destination from the UE, it transfers the MR to the EMS server 10*a*. Further, the control unit 62 updates the HO list stored in the storage unit 61 according to update information of the HO list which is transmitted from the EMS server 10*a*. Further, the control unit 62 updates the X2 information stored in the storage unit 61 according to the establishment or disconnection of the X2 link established between the eNB 51 and the adjacent eNB. Further, when the control unit 62 receives an inquiry about the another eNB that is the link destination with which the X2 link is established by the eNB 51 from the EMS server 10*a*, the control unit 62 refers to the X2 information stored in the storage unit 61 and notifies the EMS server 10*a* of the information of the adjacent eNB with which the X2 link is established.

The I/F unit 63 transmits the information received from the adjacent eNB, the EMS server 10*a*, and the MME21 to the control unit 62 and transmits the information received from the control unit 62 to the adjacent eNB, the EMS server 10*a*, or the MME21 according to the instruction of the control unit 62.

Further, the arithmetic processing devices installed in the control unit 62 is not limited to the CPU and may be a DSP.

Next, the operation of the LTE system according to this example embodiment will be described.

First, a procedure in which a control signal is transmitted and received between the eNB 51 and the eNB 52 by using a SCTP (Stream Control Transmission Protocol) and the X2 link is established will be described.

Figure 5:
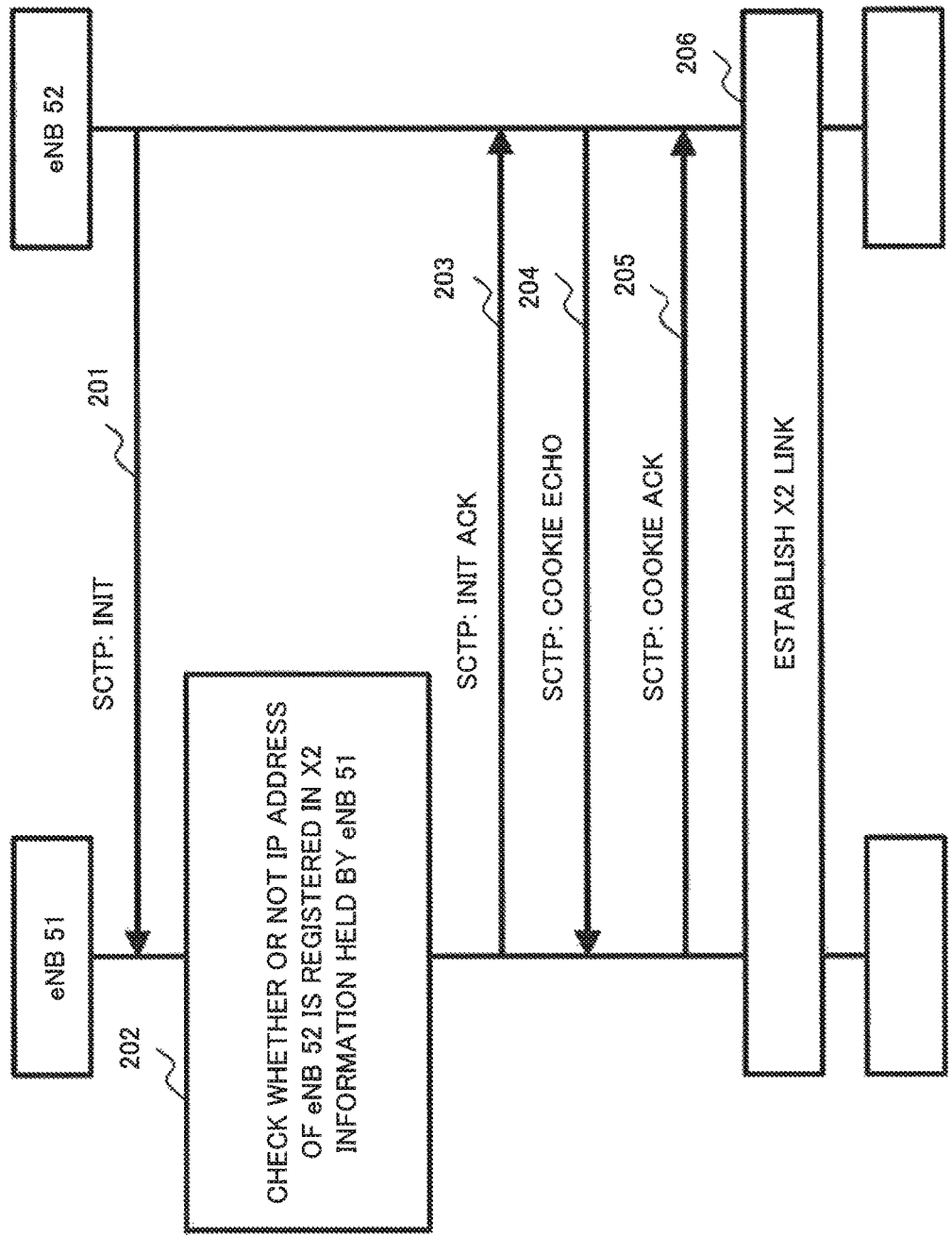
FIG. 5 is a sequence diagram showing a procedure for establishing an X2 link between base stations in an LTE system shown in FIG. 1.

FIG. 5 is a sequence diagram showing a procedure for establishing the X2 link between the base stations in the LTE system shown in FIG. 1. As a precondition of the operation, when the eNB receives an SCTP INIT chunk from the eNB which is not registered in the X2 information held by the eNB 51, the eNB 51 ignores this chunk.

In step 201, the eNB 52 transmits SCTP INIT to the eNB 51. The eNB 51 checks whether or not the IP address of the eNB 52 is registered in the X2 information stored in the storage unit 61 of the eNB 51 (Step 202). Here, it is assumed that the IP address of the eNB 52 is registered in the X2 information held by the eNB 51.

After the check of step 202, the eNB 51 transmits SCTP: INIT ACK to the eNB 52 (Step 203).

When the eNB 52 receives SCTP:INIT ACK from the eNB 51, the eNB 52 transmits SCTP:COOKIE ECHO to the eNB 51 (Step 204). When the eNB 51 receives SCTP: COOKIE ECHO from the eNB 52, the eNB 51 transmits SCTP:COOKIE ACK to the eNB 52 (Step 205). In this way, the X2 link is established between the eNB 51 and the eNB 52 (Step 206).

Further, in step 202, when the IP address of the eNB 52 is not registered in the X2 information held by the eNB 51, the eNB 51 ignores a message from the eNB 52 and performs no process.

Next, a procedure in which the EMS server 10 disconnects the useless X2 link will be described.

Figure 6:
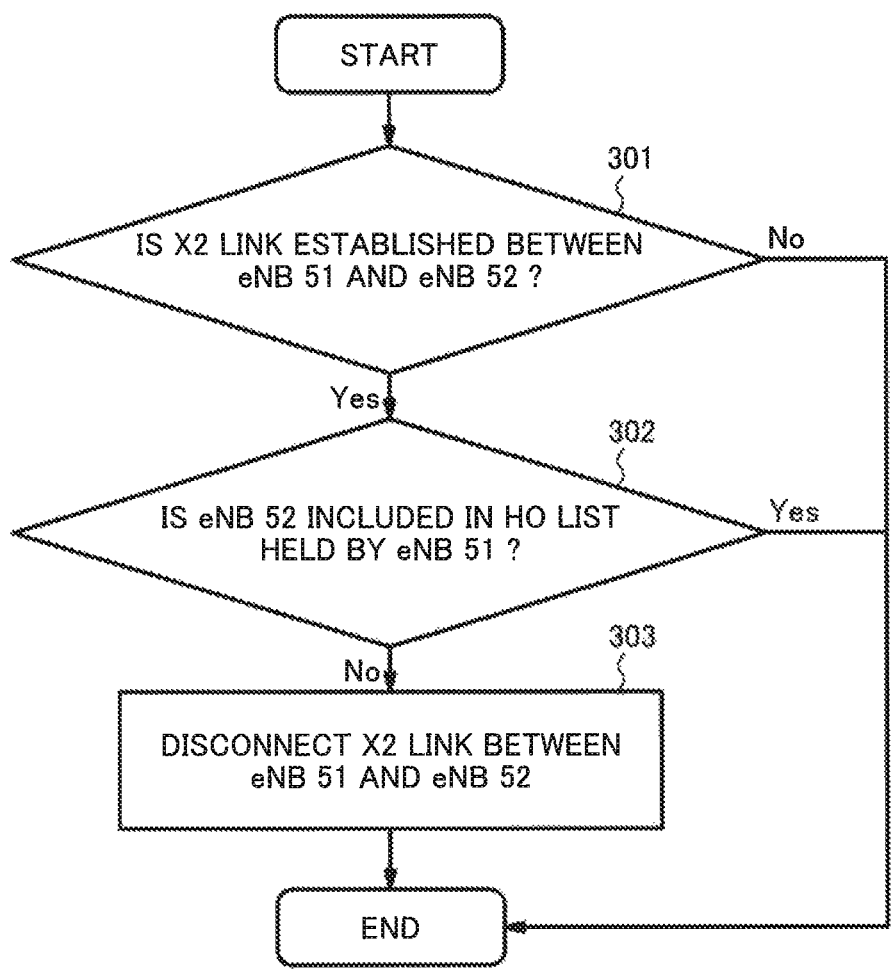
FIG. 6 is a flowchart showing a procedure in which an useless X2 link is disconnected by an EMS server in a first exemplary example embodiment.

FIG. 6 is a flowchart showing the procedure in which the EMS server according to this example embodiment disconnects the useless X2 link. Here, a case in which the EMS server 10a determines whether to disconnect or not the X2 link by checking whether or not the eNB 52 with which the X2 link is established by the eNB 51 that is the managed eNB is included in the HO list will be described.

In step 301 shown in FIG. 6, the control unit 12 of the EMS server 10a checks whether or not the X2 link is established between the eNB 51 and the eNB 52. When the X2 link is established between the eNB 51 and the eNB 52, the control unit 12 checks whether or not the eNB 52 is included in the HO list held by the eNB 51 (step 302).

When a result of the determination of step 302 shows that the eNB 52 is not included in the HO list held by the eNB 51, the control unit 12 disconnects the X2 link between the eNB 51 and the eNB 52 (step 303). On the other hand, when a result of the determination of step 302 shows that the eNB 52 is included in the HO list held by the eNB 51, the control unit 12 does not disconnect the X2 link between the eNB 51 and the eNB 52. Further, when a result of the determination of step 301 shows that the X2 link is not established between the eNB 51 and the eNB 52, the control unit 12 performs no process.

In this way, the EMS server can search for and disconnect the useless X2 link when the information of the eNB excluded from the candidate for the handover destination among the managed eNBs of the EMS server is removed from the HO list or another reason exists.

In this example embodiment, in the mobile communication system, it is determined whether to disconnect or not the X2 link by checking whether or not the eNB with which the X2 link is established by the eNB managed by the EMS server is included in the HO list by the SON function. When the X2 link that is established between the eNB managed by the EMS server and the eNB which is not registered in the HO list exists, the X2 link is automatically removed by the SON function. As a result, the useless X2 link can be prevented from being established.

Further, the number of the X2 links which can be established between the eNBs is limited. Therefore, by automatically searching for and disconnecting the useless X2 link among the established X2 links by the SON function, the resource for the X2 link/SCTP link can be saved.

Further, when the useless X2 link is removed, the necessary X2 link can be newly established. Accordingly, the number of handovers via the S1 link can be reduced. As a result, the burden on the core network can be reduced.

As described above, in this example embodiment, it is determined whether or not the X2 link is useless based on the HO list. Namely, a complicated process in which the number of occurrences of handover is counted based on the HO list is not used in this example embodiment. Therefore, by using this example embodiment, the burden on the EMS server can be reduced compared to the method disclosed in patent literature 1. Further, the method of the present invention has the following advantage compared to the method disclosed in patent literature 1.

In the method disclosed in patent literature 1, the HO occurrence times is compared with the threshold value and when the HO occurrence times is smaller than the threshold value, the control in which the X2 link is disconnected is performed. Therefore, when a link establishment is requested by the eNB of which the HO occurrence times is smaller than the threshold value again and whereby the HO occurrence times exceeds the threshold value, the X2 link is established. When the eNB of which the HO occurrence times repeatedly increases above and decreases below the threshold value exists, when the method disclosed in patent literature 1 is used, the X2 link establishment and the X2 link disconnection are repeatedly performed, in other words, the state change of the X2 link occurs, and whereby, the burden on the eNB and the EMS server may increase greatly.

In contrast, in the mobile communication system according to this example embodiment, the X2 link connected to the adjacent eNB that is not registered in the HO list is removed by the SON function and on the one hand, the X2 link is established with the adjacent eNB that is newly registered in the HO list. Namely, when the X2 link that has been once removed is registered in the HO list again, the X2 link is established because the X2 link is required when the UE performs handover. In this example embodiment, the X2 link is established with only the eNB which "is registered in the HO list", in other words, with which "the X2 link has to be established for the handover of the UE". Therefore, the above-mentioned state change of the X2 link can be suppressed.

Second Example Embodiment

In a second exemplary example embodiment, the SON function of the EMS server described in the first exemplary example embodiment is installed in the control unit of the eNB. Further, in this example embodiment, a detailed description of the configuration similar to that of the first example embodiment will be omitted.

The configuration of the eNB according to this example embodiment will be described with reference to FIG. 4.

As shown in FIG. 4, the SON function described in the first example embodiment is installed in the control unit 62 of the eNB according to this example embodiment. However, a process for collecting the HO list of another eNB is not performed. The control unit 62 refers to the HO list and the X2 information stored in the storage unit 61, determines whether or not the X2 link established with the another eNB is useless, and determines whether to disconnect or not the X2 link according to a determination result.

Further, the process performed by the eNB according to this example embodiment is similar to the process explained by referring to FIG. 6. Therefore, the detailed description will be omitted.

This example embodiment has an effect similar to that of the first example embodiment and can reduce the burden on the EMS server.

Third Example Embodiment

In a third exemplary example embodiment, in the process performed by the EMS server described in the first exemplary example embodiment, when the X2 link between the managed eNBs is checked and the useless X2 link is removed, only the X2 link that is not included in both the HO list held by the eNBs is removed.

Further, in this example embodiment, a detailed description of the configuration similar to that of the first example embodiment will be omitted. Further, in the explanation of this example embodiment, it is assumed that the eNB 51 and the eNB 52 are the managed eNBs of the EMS server 10*a* like the first example embodiment. Further, with respect to the EMS server, the configuration and the operation of the EMS server 10*a* will be described. The description of the EMS server 10*b* will be omitted.

The configuration of the EMS server according to this example embodiment will be described.

In the eNB 51 and the eNB 52 between which the X2 link is established, a function to check whether or not the eNB 51 is registered in the HO list held by the eNB 52 after checking whether or not the eNB 52 is registered in the HO list held by the eNB 51 is added to the SON function of the EMS server 10*a* shown in FIG. 2.

Figure 7:
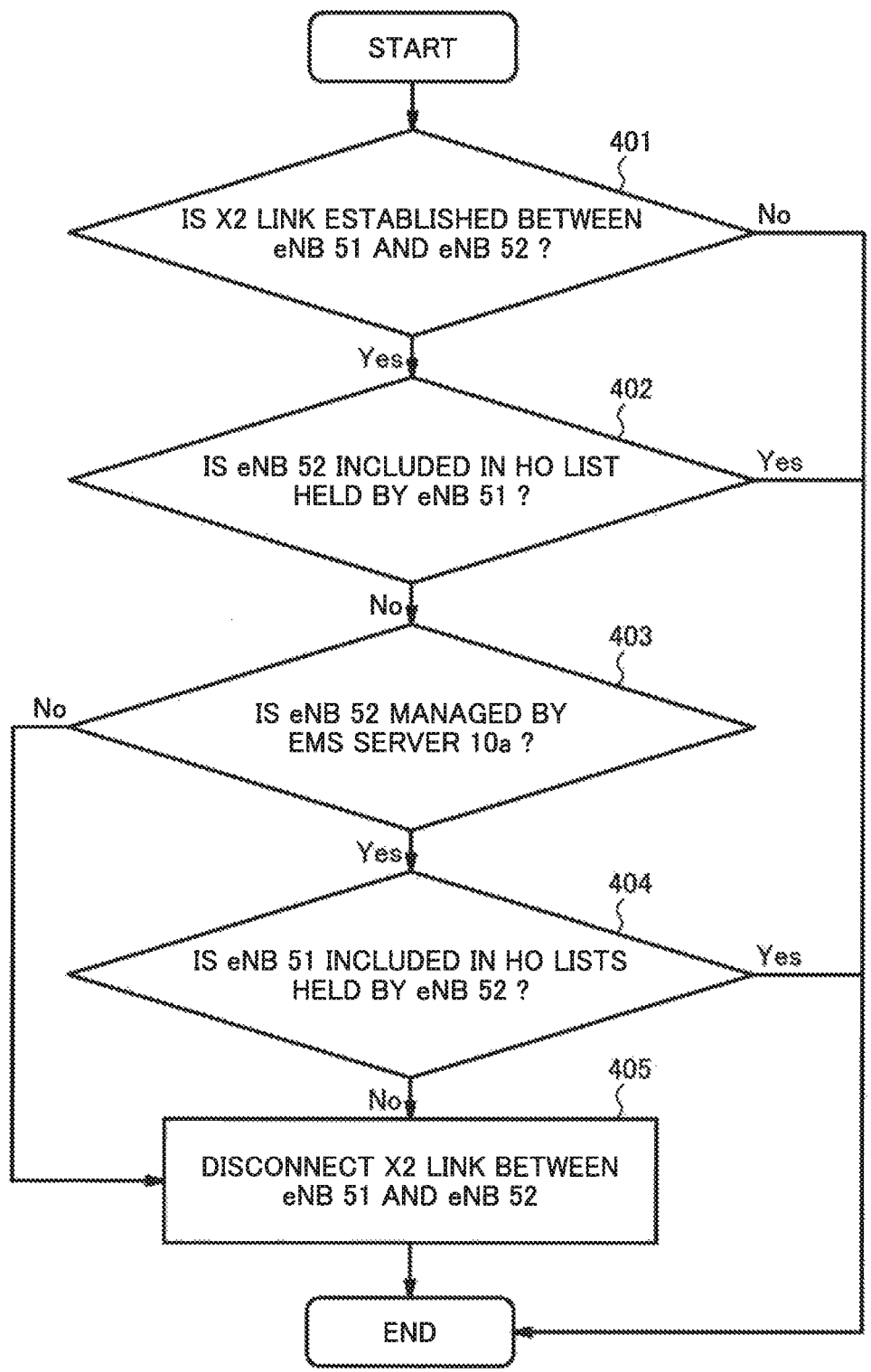
FIG. 7 a flowchart showing an operation procedure of an EMS server according to a third exemplary example embodiment.

The operation of the EMS server according to this example embodiment will be described. FIG. 7 is a flowchart showing an operation procedure of the EMS server according to this example embodiment.

FIG. 7 shows a process in which the EMS server 10*a* determines whether to disconnect or not the X2 link by checking whether or not the eNB 51 and the eNB 52 that are the managed eNBs and establish the X2 link between them register the eNB 52 and the eNB 51 in the HO list held by them, respectively.

The control unit 12 checks whether or not the X2 link is established between the eNB 51 and the eNB 52 (step 401). When the X2 link is established between these eNBs, the control unit 12 checks whether or not the eNB 52 is included in the HO list held by the eNB 51 (step 402). When a result of the determination of step 402 shows that the eNB 52 is not included in the HO list held by the eNB 51, the control unit 12 checks whether or not the eNB 52 is the managed eNB of the EMS server 10*a* (step 403).

Here, because the eNB 52 is the managed eNB of the EMS server 10*a*, the process advances to step 404 and the control unit 12 checks whether or not the eNB 51 is included in the HO list held by the eNB 52. When a result of the determination of step 404 shows that the eNB 52 is not included in the HO list held by the eNB 51, the control unit 12 disconnects the X2 link between the eNB 51 and the eNB 52 (step 405). On the other hand, when a result of the determination of step 404 shows that the eNB 52 is included in the HO list held by the eNB 51, the control unit 12 does not disconnect the X2 link between the eNB 51 and the eNB 52. Further, even when a result of the determination of step 402 shows that the eNB 52 is included in the HO list held by the eNB 51, the control unit 12 does not disconnect the X2 link.

In this example embodiment, only when it is determined by each of two managed eNBs between which the X2 link is established that the X2 link is useless for each eNB, the X2 link can be removed.

Fourth Example Embodiment

In a fourth exemplary example embodiment, a function to check whether or not the managed eNB is included in the adjacent cell information held by the non-managed eNB when the X2 link is established between the managed eNB and the non-managed eNB is added in the process performed by the EMS server described in the third exemplary example embodiment. By this function, only the X2 link that is useless for both the managed eNB and the non-managed eNB is removed.

Further, in this example embodiment, a detailed description of the configuration similar to that of the first example embodiment will be omitted. Further, in the explanation of this example embodiment, it is assumed that the eNB 51 is the managed eNB of the EMS server 10*a* and the eNB 53 is the non-managed eNB of the EMS server 10*a*. Further, with respect to the EMS server, the configuration and the operation of the EMS server 10*a* will be described. The description of the EMS server 10*b* will be omitted.

The configuration of the EMS server 10*a* according to this example embodiment will be described with reference to FIG. 2.

The following function is added to the SON function performed in the control unit 12 of the EMS server 10*a* according to this example embodiment. When the control unit 12 recognizes that the eNB that is the link destination with which the X2 link is established by the managed eNB 51 is the non-managed eNB 53, the control unit 12 acquires the adjacent cell information held by the non-managed eNB 53 via the managed eNB 51, stores it in the storage unit 11, and manages it. The control unit 12 determines whether or not the managed eNB 51 is included in the adjacent cell information held by the non-managed eNB 53 and determines whether to disconnect or not the X2 link according to the determination result.

A structure of the adjacent cell information held by the non-managed eNB will be described.

The information of the base station that is the handover destination of the non-managed eNB is registered in the adjacent cell information held by the non-managed eNB. When the non-managed eNB is a source eNB and the managed eNB is a target eNB, this adjacent cell information is information included in an ENB configuration update (ENB CONFIGURATION UPDATE) message that is transmitted to the managed eNB by the non-managed eNB. The ENB configuration update message is disclosed in "chapter 8. 3. 5" of non-patent literature 1 and the message is disclosed in detail in "chapter 9. 1. 2. 8". Therefore, the detailed description will be omitted.

FIG. 8 is a figure showing an example of the adjacent cell information stored in the EMS server according to this example embodiment.

For example, after the managed eNB 51 receives the ENB configuration update message from the non-managed eNB 53, the control unit 12 of the EMS server 10*a* acquires the ENB configuration update message of the non-managed eNB 53 from the managed eNB 51. In a similar way, the control unit 12 also acquires the ENB configuration update message of the non-managed eNB from the managed eNB 52. The control unit 12 summarizes the content of the message collected in such way, creates the adjacent cell information shown in FIG. 8, stores the adjacent cell information in the storage unit 11, and manages it. Further, the control unit 12 may store the collected message in the storage unit 11 without any change for each non-managed eNB as the adjacent cell information.

In the adjacent cell information shown in FIG. 8, served cell information (Served Cell Info) and adjacent information (Neighbor info) are registered. The sub column of the adjacent information column is similar to that of the adjacent cell information shown in FIG. 3. Therefore, the detailed description will be omitted.

The served cell information column shown in FIG. 8 has a "plmn ID" sub column in addition to the "cell ID" sub column, the "PCI" sub column, and the "TAC" sub column unlike the served cell information column shown in FIG. 3. The plmn ID is an identifier of a Public Land Mobile Network.

Figure 9:
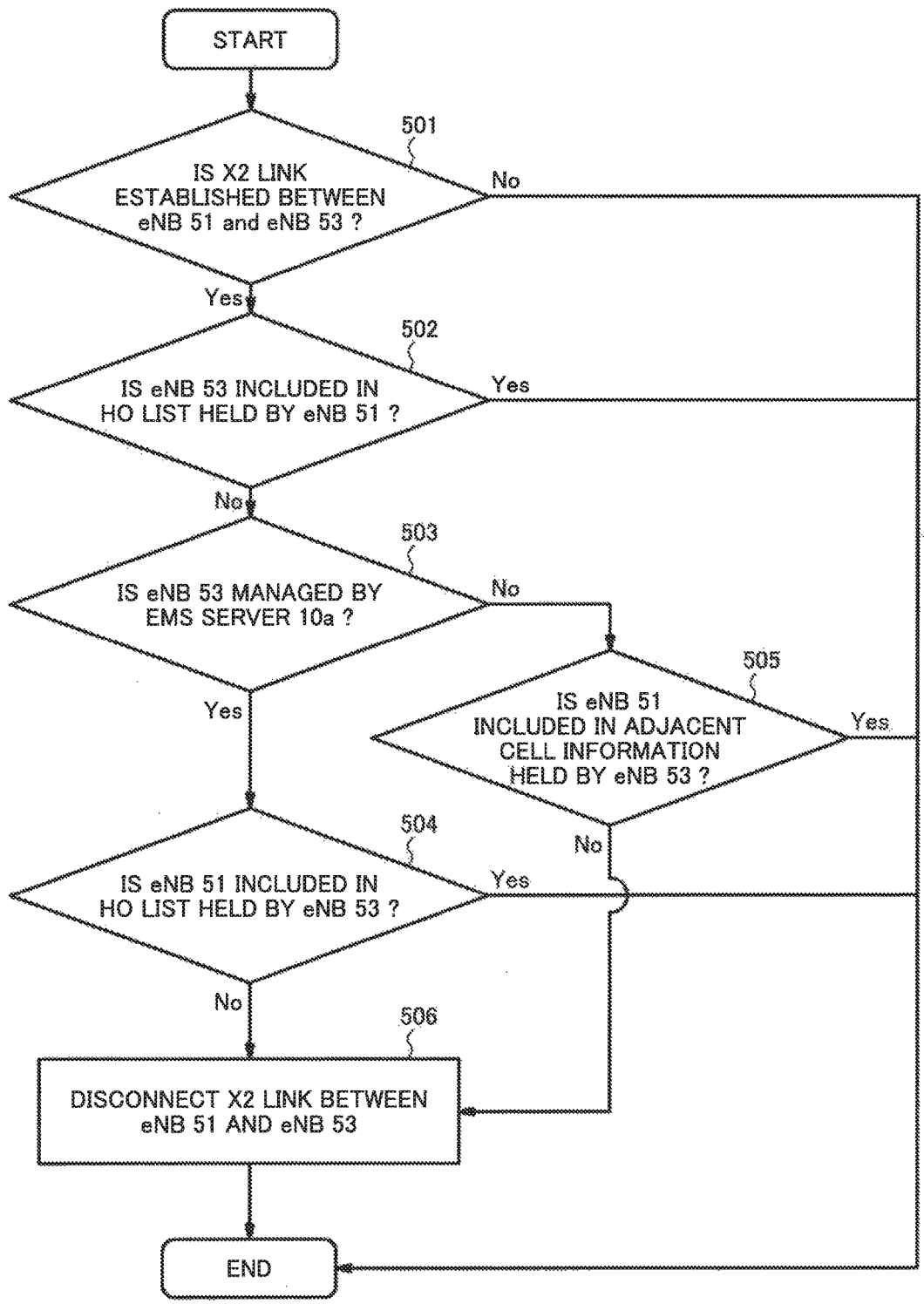
FIG. 9 a flowchart showing an operation procedure of an EMS server according to a fourth exemplary example embodiment.
Figure 10:
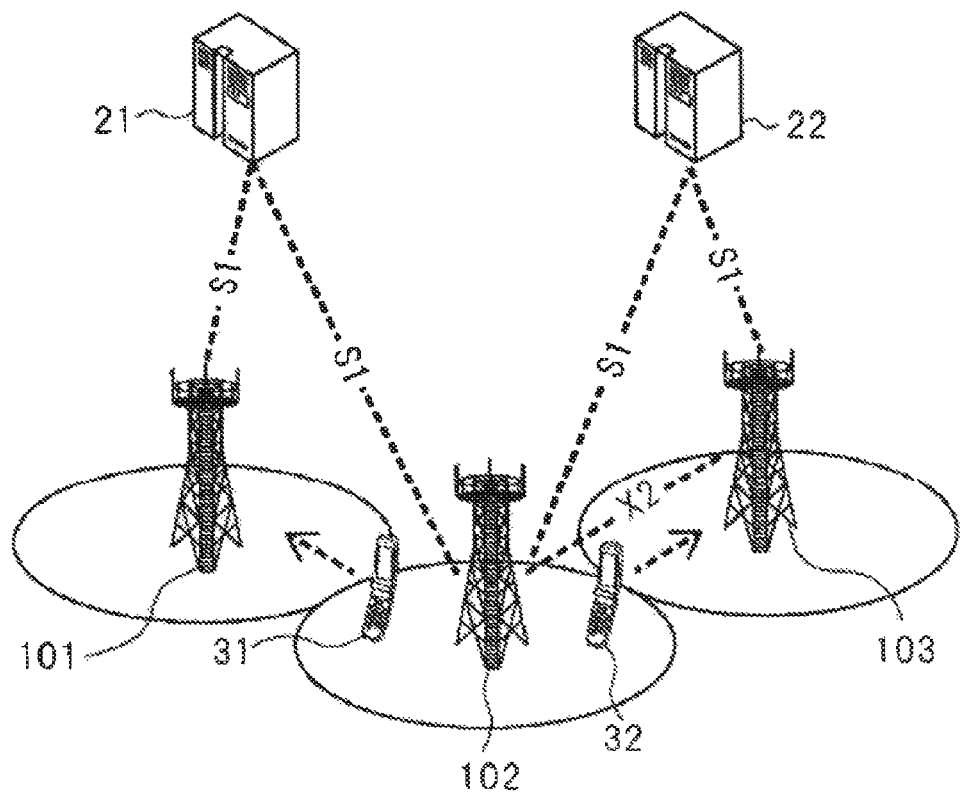
FIG. 10 is a figure for illustrating a communication network including a related LTE system.
Figure 11:
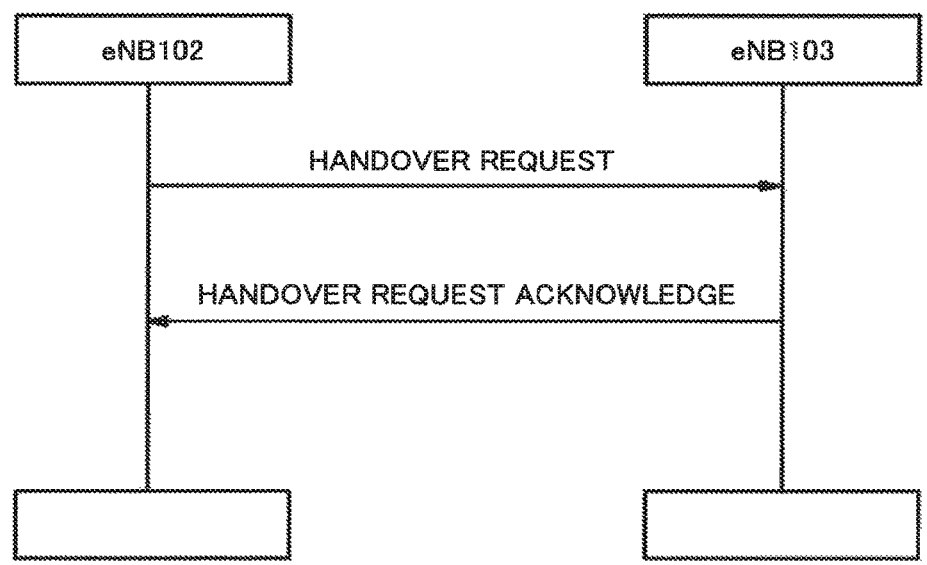
FIG. 11 is a sequence diagram showing a procedure of handover between eNBs shown in FIG. 10.

The operation of the EMS server according to this example embodiment will be described. FIG. 9 is a flowchart showing an operation procedure of the EMS server according to this example embodiment.

FIG. 9 shows a process in which the EMS server 10a determines whether to disconnect or not the X2 link by checking whether or not the managed eNB 51 is included in the adjacent cell information held by the non-managed eNB 53 with which the X2 link is established by the managed eNB 51.

The control unit 12 checks whether or not the X2 link is established between the eNB 51 and eNB 53 (step 501). When the X2 link is established between these eNBs, the control unit 12 checks whether or not the eNB 53 is included in the HO list held by the eNB 51 (step 502). When a result of the determination of step 502 shows that the eNB 53 is not included in the HO list held by the eNB 51, the control unit 12 checks whether or not the eNB 53 is the managed eNB of the EMS server 10a (step 503).

Here, because the eNB 53 is the non-managed eNB of the EMS server 10a, the process advances to step 505 and the control unit 12 checks whether or not the eNB 51 is included in the adjacent cell information held by the eNB 53. When a result of the determination of step 505 shows that the eNB 51 is not included in the adjacent cell information held by the eNB 53, the control unit 12 disconnects the X2 link between the eNB 51 and eNB 53 (step 506). On the other hand, when a result of the determination of step 505 shows that the eNB 51 is included in the adjacent cell information held by the eNB 53, the control unit 12 does not disconnect the X2 link between the eNB 51 and the eNB 53. Further, when a result of the determination of step 503 shows that the eNB 53 is the managed eNB of the EMS server 10a, the procedure after step 503 is similar to the procedure shown in FIG. 7. Therefore, the description will be omitted.

By using this example embodiment, only when the managed eNB and the non-managed eNB between which the X2 link is established determine that the X2 link is useless for each eNB, the X2 link can be removed. Further, the EMS server can remove the useless X2 link established between the managed eNB and the non-managed eNB.

Further, the third and fourth exemplary example embodiments have been described based on the first exemplary example embodiment. However, the third and fourth exemplary example embodiments may be applied to the second exemplary example embodiment. In this case, each eNB only has to determine whether or not the partner eNB is registered in the HO list or the adjacent cell information held by the own eNB and it is not necessary to perform the process of step 403 shown in FIG. 7 and the process of step 503 shown in FIG. 9.

The exemplary example embodiment is more effective when the number of the X2 links established between the eNBs exceeds the maximum established number of the X2 links in the LTE system.

Fifth Example Embodiment

Next, an LTE system according to a fifth exemplary example embodiment will be described.

The eNB 51 according to this example embodiment can store the IP address of the eNB 52 for a fixed period of time when the X2 link between the eNB 51 and the eNB 52 is disconnected by the SON function shown in FIG. 6, FIG. 7, or FIG. 9. When the X2 link is disconnected by this SON function, the information (hereinafter, referred to as disconnection information) of the IP address may be stored in the storage unit 61 of the eNB 51 mentioned above or another storage device. Further, the disconnection information may be included in the X2 information mentioned above or may be stored separately from the X2 information. Further, the eNB 51 has a configuration similar to that of the eNB 51 shown in the above-mentioned example embodiment.

Further, just after the X2 link between the eNB 51 and the eNB 52 is disconnected, when the eNB 52 concerned transmits SCTP INIT that is a connection request to the eNB 51, the eNB 51 can ignore this connection request without establishing the X2 link again. The eNB 51 can ignore this connection request for a predetermined time period.

Further, in the example embodiment mentioned above, the control unit 62 updates the X2 information stored in the storage unit 61 according to the state (link established state or link disconnected state) of the X2 link between the eNB 51 and the adjacent eNB.

Figure 12:
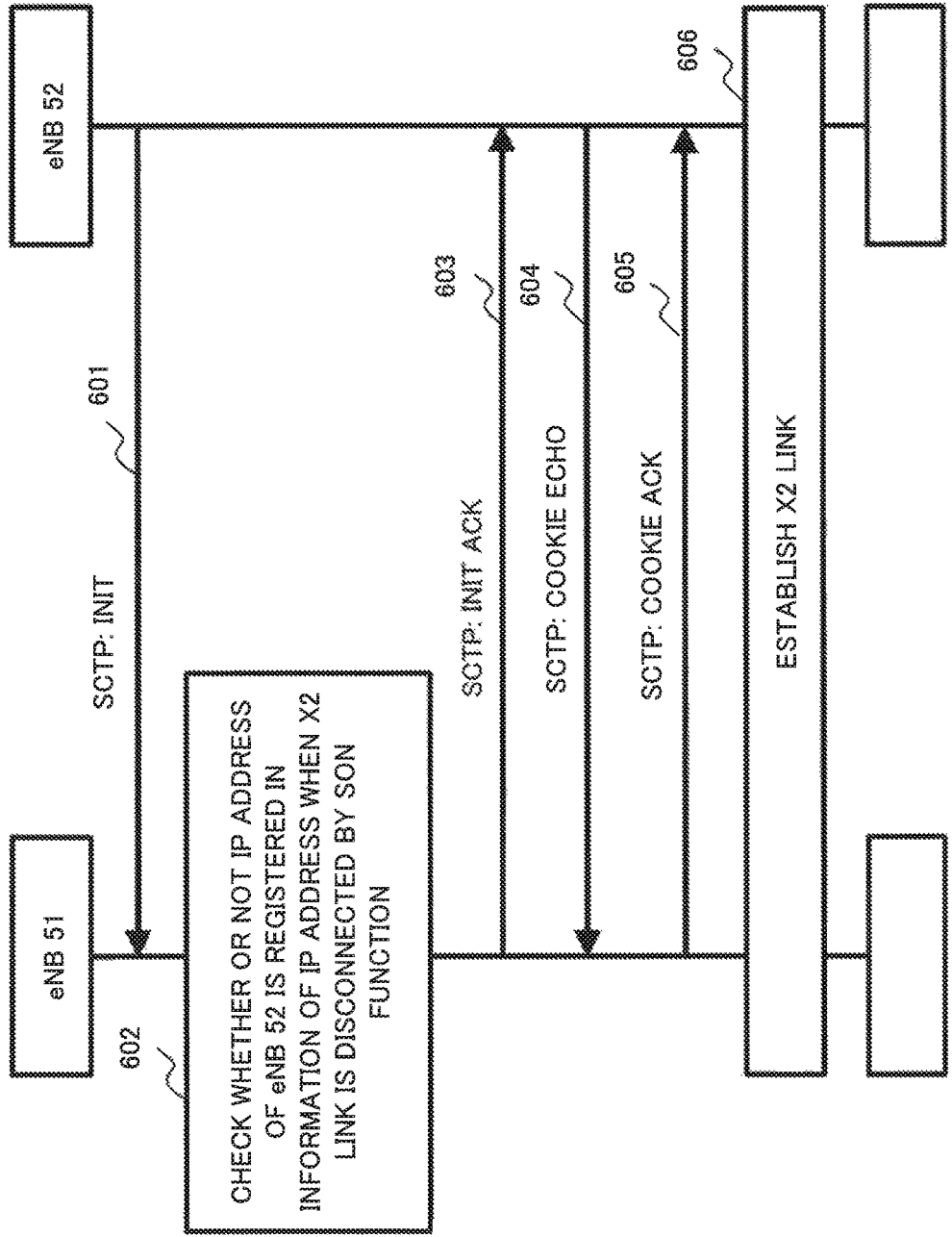
FIG. 12 is a sequence diagram showing operation in a fifth exemplary example embodiment.

FIG. 12 shows a procedure for establishing the X2 link between the base stations in the LTE system shown in FIG. 1. In FIG. 12, the procedure in which a control signal is transmitted and received by using a SCTP (Stream Control Transmission Protocol) between the eNB 51 and the eNB 52 and the X2 link is established is shown.

In step 601, the eNB 52 transmits SCTP:INIT to the eNB 51.

In step 602, the eNB 51 checks whether or not the IP address of the eNB 52 is registered in the information (hereinafter, referred to as disconnection information) of the IP address when the X2 link between the eNB 51 and the eNB 52 is disconnected by the SON function (step 602). Here, it is assumed that the IP address of the eNB 52 is not registered in the disconnection information held by the eNB 51.

In step 603 (after the check of step 602), the eNB 51 transmits SCTP:INIT ACK to the eNB 52.

In step 604, when the eNB 52 receives SCTP:INIT ACK from the eNB 51, the eNB 52 transmits SCTP:COOKIE ECHO to the eNB 51.

In step 605, when the eNB 51 receives SCTP:COOKIE ECHO from the eNB 52, the eNB 51 transmits SCTP:COOKIE ACK to the eNB 52.

In this way, the X2 link is established between the eNB 51 and the eNB 52 (step 606).

Further, in step 602, when the IP address of the eNB 52 is registered in the disconnection information, the eNB 51 ignores the message from the eNB 52 and performs no process.

By using this example embodiment, the useless process in which the X2 link is repeatedly established and disconnected can be prevented from being carried out. As a result, communication quality degradation due to the repetition of connection and disconnection of the X2 link and the burden on the eNB can be reduced. Namely, the useless X2 link is kept in a disconnection state and whereby, the repetition of connection and disconnection of the X2 link can be suppressed and a possibility that a usable X2 link is established can be improved.

Further, the above-mentioned example embodiment can be applied to a wireless communication system such as 3GPP LTE (Long Term Evolution), 3GPP W-CDMA (Wideband Code Division Multiple Access), GSM (registered trademark) (Global System for Mobile communications), WiMAX (Worldwide interoperability for Microwave Access), or the like. However, the applicable wireless communication system is not limited to these systems.

Further, the above-mentioned wireless communication system and the wireless communication terminal can be realized by hardware, software, or a combination of hardware and software. Further, the method for controlling the above-mentioned wireless communication system can also be realized by hardware, software, or a combination of hardware and software. Here, the realization by software is to realize the wireless communication system or the like by performing a process in which a computer reads a program and executes it.

The program is stored in various types of non-transitory computer-readable media and can be supplied to the computer. The non-transitory computer-readable medium includes various types of tangible storage media.

The non-transitory computer-readable medium includes a medium such as a magnetic recording medium (for example, a flexible disc, a magnetic tape, or a hard disk drive), a magneto-optical recording medium (for example, a magneto-optical disk), a CD-ROM (Compact Disc-Read Only Memory), a CD-R (Compact Disc-Recordable), a CD-R/W (Compact Disc-Rewritable), a DVD-ROM (Digital Versatile Disc-ROM), a DVD-R (Digital Versatile Disc-Recordable), a DVD-R/W (Digital Versatile Disc-Rewritable), or a semiconductor memory (for example, a mask ROM, a PROM (Programmable ROM), an EPROM (Erasable PROM), a flash ROM, or a RAM (Random Access Memory)).

Further, the program may be supplied to the computer from various types of transitory computer-readable media. The transitory computer-readable medium includes a medium such as an electric signal, an optical signal, or a radio wave. The program can be supplied to the computer from the transitory computer-readable medium via a wired communication path such as an electric wire, an optical fiber, or the like or a wireless communication path.

The present invention has been described above with reference to the example embodiment. However, the present invention is not limited to the above-mentioned example embodiment. Various changes in the configuration or details of the invention of the present application that can be understood by those skilled in the art can be made without departing from the scope of the invention of the present application.

This application claims priority from Japanese Patent Application No. 2014-117430 filed on Jun. 6, 2014, the disclosure of which is hereby incorporated by reference in its entirety.

REFERENCE SIGNS LIST 10a and 10b EMS server
11 storage unit
12 control unit
13 I/F unit
51 to 53 eNB

What is claimed is:

1. A server device comprising:
a non-transitory storage medium connected to a wireless access network and configured to store a handover list, the handover list being a list in which a base station that is a handover destination of a mobile terminal wirelessly connected to a managed base station is registered, the managed base station being a base station managed by the server device; and
a processor configured to determine whether to keep or disconnect an established inter station link by determining whether another base station that establishes the established inter station link with the managed base station is registered in the handover list, the established inter station link being a communication link between the another base station and the managed base station,
wherein a non-managed base station that is a base station not managed by the server device is connected to the wireless access network, and
wherein the processor
performs a first check to check whether the non-managed base station is registered in the handover list of the managed base station when the processor recognizes that the inter station link is established between the non-managed base station and the managed base station,
acquires neighbor cell information including information of a base station that becomes a handover destination of the non-managed base station from the non-managed base station via the managed base station,
performs a second check to check whether the managed base station is registered in the adjacent cell information,
disconnects the inter station link established between the managed base station and the non-managed base station when results of the first and second checks determine that the non-managed base station and the managed base station are not registered in the handover list of the managed base station and the adjacent cell information of the non-managed base station, respectively, and
keeps the inter station link when the non-managed base station is registered in the handover list of the managed base station or the managed base station is registered in the adjacent cell information of the non-managed base station or both.

2. An information processing method for a server device to manage a base station connected to a wireless access network, the method comprising:
reading a handover list that is a list in which another base station that becomes a handover destination of a mobile terminal wirelessly connected to a managed base station that is the base station being managed is registered; and
determining whether to keep or disconnect an established inter station link by determining whether the another base station with which the inter station link, that is a communication link between the managed base station and the another base station, is established is registered in the handover list,
wherein a non-managed base station that is a base station not managed by the server device is connected to the wireless access network, and
wherein the method further comprises:
performing a first check to check whether the non-managed base station is registered in the handover list of the managed base station when recognizing that the inter station link is established between the non-managed base station and the managed base station;
acquiring neighbor cell information including information of a base station that becomes a handover destination of the non-managed base station from the non-managed base station via the managed base station;
performing a second check to check whether the managed base station is registered in the adjacent cell information;
disconnecting the inter station link established between the managed base station and the non-managed base station when results of the first and second checks determine that the non-managed base station and the managed base station are not registered in the handover list of the managed base station and the adjacent cell information of the non-managed base station, respectively; and keeping the inter station link when the non-managed base station is registered in the handover list of the managed base station or the managed base station is registered in the adjacent cell information of the non-managed base station or both.

3. A non-transitory computer readable medium for storing a program which causes a computer for managing a base station connected to a wireless access network to perform a method comprising:

reading a handover list that is list in which the base station that is a handover destination of a mobile terminal wirelessly connected to a managed base station that is a base station managed by a server device is registered; and determining whether to disconnect an established inter station link by determining whether another base station with which the inter station link, that is a communication link between the managed base station and the another base station, is established is registered in the handover list, wherein a non-managed base station that is a base station not managed by the server device is connected to the wireless access network, and wherein the method further comprises:

performing a first check to check whether the non-managed base station is registered in the handover list of the managed base station when recognizing that the inter station link is established between the non-managed base station and the managed base station;

acquiring neighbor cell information including information of a base station that becomes a handover destination of the non-managed base station from the non-managed base station via the managed base station;

performing a second check to check whether the managed base station is registered in the adjacent cell information;

disconnecting the inter station link established between the managed base station and the non-managed base station when results of the first and second checks determine that the non-managed base station and the managed base station are not registered in the handover list of the managed base station and the adjacent cell information of the non-managed base station, respectively; and keeping the inter station link when the non-managed base station is registered in the handover list of the managed base station or the managed base station is registered in the adjacent cell information of the non-managed base station or both.

* * * * *